(12) United States Patent
Sträng

(10) Patent No.: US 11,976,765 B2
(45) Date of Patent: May 7, 2024

(54) LEAD-THROUGH COMPRISING A SEAL AND AN OUTER DIAMETER EXTENDER

(71) Applicant: ROXTEC AB, Karlskrona (SE)

(72) Inventor: Daniel Sträng, Karlskrona (SE)

(73) Assignee: ROXTEC AB, Karlskrona (SE)

( * ) Notice: Subject to any disclaimer, the term of this patent is extended or adjusted under 35 U.S.C. 154(b) by 709 days.

(21) Appl. No.: 17/254,726

(22) PCT Filed: Jun. 19, 2019

(86) PCT No.: PCT/SE2019/050585
§ 371 (c)(1),
(2) Date: Dec. 21, 2020

(87) PCT Pub. No.: WO2020/005141
PCT Pub. Date: Jan. 2, 2020

(65) Prior Publication Data
US 2021/0270393 A1    Sep. 2, 2021

(30) Foreign Application Priority Data

Jun. 27, 2018   (SE) .................................. 1850795-4

(51) Int. Cl.
*F16L 21/00* (2006.01)
*F16L 5/08* (2006.01)
*H02G 15/013* (2006.01)

(52) U.S. Cl.
CPC .............. *F16L 5/08* (2013.01); *H02G 15/013* (2013.01)

(58) Field of Classification Search
CPC ..... F16L 5/02; F16L 5/08; F16L 17/02; F16L 17/04; F16L 21/06; F16L 23/16; F16L 55/162; F16L 55/163; F16L 55/165; F16L 55/168; F16L 55/17; F16L 55/1705; F16L 55/171; F16L 55/178
See application file for complete search history.

(56) References Cited

U.S. PATENT DOCUMENTS 3,408,096 A * 10/1968 Stephenson ............. F16L 17/04
                                                      285/330
4,993,724 A    2/1991 Hauff
(Continued)

FOREIGN PATENT DOCUMENTS

CN      1555469 A    12/2004
DE    29924372 U1    12/2002
(Continued)

OTHER PUBLICATIONS

Chinese Office Action for CN Application No. 201980042869.3 dated Mar. 2, 2022 (17 pages, with English translation).
(Continued)

*Primary Examiner* — Aaron M Dunwoody
(74) *Attorney, Agent, or Firm* — Merchant & Gould P.C.

(57) ABSTRACT

A lead-through for cables, wires or pipes comprising a cylindrical seal and an outer diameter extender. The outer diameter extender is adapted to be mounted on an outer surface of the cylindrical seal. The outer diameter extender comprises two parts, wherein each of the two parts has at least one protruding part and at least one recess. The at least one protruding part of one of the parts of the outer diameter extender is to be received in the at least one recess of the other part of the outer diameter extender.

14 Claims, 2 Drawing Sheets

(56) References Cited

U.S. PATENT DOCUMENTS

| | | |
|---|---|---|
| 5,697,194 A | 12/1997 | Gignac et al. |
| 7,631,880 B2 | 12/2009 | Hellkvist |
| 2004/0169341 A1 | 9/2004 | Hellkvist |
| 2009/0130891 A1 | 5/2009 | Milton |
| 2013/0113166 A1 | 5/2013 | Hjerpe |

FOREIGN PATENT DOCUMENTS

| | | |
|---|---|---|
| DE | 202011108274 U1 | 2/2012 |
| EP | 2597344 A1 | 5/2013 |
| GB | 2334770 A | 9/1999 |
| JP | 2009112138 A | 5/2009 |
| JP | 2014109366 A | 6/2014 |
| JP | 2015068395 A | 4/2015 |
| RU | 2186449 C2 | 7/2002 |
| RU | 2270392 C2 | 2/2006 |
| WO | 2010089289 A2 | 8/2010 |

OTHER PUBLICATIONS

Office Action dated May 25, 2023 in the corresponding Japanese application, No. 2020-570574 (4 pages).
International Search Report for International Application PCT/SE2019/050585 dated Aug. 9, 2019 (3 pages).
Extended European Search Report for EP Application No. 19825435.1 dated Feb. 15, 2021 (8 pages).

\* cited by examiner

LEAD-THROUGH COMPRISING A SEAL AND AN OUTER DIAMETER EXTENDER

This application is a National Stage Application of PCT/SE2019/050585, filed 19 Jun. 2019, which claims benefit of Serial No. 1850795-4, filed 27 Jun. 2018, in Sweden and which applications are incorporated herein by reference. To the extent appropriate, a claim of priority is made to each of the above disclosed applications.

TECHNICAL FIELD

The present invention refers to a lead-through for cables, wires or pipes through a wall or other partition

BACKGROUND

When cables, wires or pipes are to go through a wall, a roof or other partition, the cables, wires or pipes are often received in a seal placed in an opening in a wall or the like. The seal may also be placed in a sleeve placed in an opening of a wall or the like. For ease of description the expression "cable" is mainly used in this description, but it should be construed broadly and a person skilled in the art realizes that it normally also covers pipes and wires. In a corresponding way the expression "wall" is mainly used in this description, but it should be construed broadly and to normally cover any type of partition.

Seals for cable transition often have a cylindrical compressible body. The compressible body is compressed axially between fittings placed at opposite ends of the compressible body. By the axial compression the compressible body will expand radially both inwards and outwards. By the radial expansion outwards the seal can be received in sleeves or openings having a certain diameter range. To function in the desired way the seal should fit snugly into the sleeve or the opening of the wall in which it is received.

Seals of the above kind are used for sealing in many different environments, such as for cabinets, technical shelters, junction boxes and machines. They are used in different industrial environments, such as automotive, telecom, power generation and distribution, as well as marine and offshore. The seals may have to seal against fluid, gas, fire, rodents, termites, dust, moisture etc. and may receive cables or wires for electricity, communication, computers etc., pipes for different gases or liquids such as water, compressed air, hydraulic fluid and cooking gas or wires for load retention.

The seals used today are normally useable for holes having an inner diameter within a certain range. To cover a large range of inner diameters a number of seals are used and have to be kept in stock. Thus, the diameter of the opening of the sleeve or the wall dictates which seal that is to be used.

SUMMARY

An object of the present invention is to increase the diameter range of cylindrical seals and thereby be able to reduce the number of seals that are to be kept in stock.

According to one aspect of the present invention, a lead-through for cables, wires or pipes is provided. The lead-through comprises a cylindrical seal and an outer diameter expander. The outer diameter expander is adapted to be mounted on an outer surface of the cylindrical seal. The outer diameter extender is formed of two parts. Each of said two parts has at least one protruding part and at least one recess. The at least on protruding part of one of the parts of the outer diameter extender is to be received in the at least one recess of the other part of the outer diameter extender.

According to another aspect of the present invention, the outer diameter expander comprises a cylindrical part and a flange at one end of the cylindrical part. Said flange is perpendicular to said cylindrical part and is directed inwards towards the centre of the outer diameter extender. The flange has a number of through openings and extends along the circumference of the cylindrical part.

By means of the outer diameter extender of the present invention the possible range for each seal is increased, which means that seals of fewer different sizes have to be kept in stock. For each diameter range, no outer diameter extender is used in a lower part of the range while it is used for a higher part of the range of outer diameters.

Further objects and advantages of the present invention will be obvious to a person skilled in the art when reading the detailed description below of embodiments of the invention.

BRIEF DESCRIPTION OF THE DRAWINGS

The invention will be described further below by way of example and with reference to the enclosed drawings. In the drawings.

DETAILED DESCRIPTION

As used in this description the terms "axial", "radial", "circumferential" and similar expressions are in view of a cable, wire or pipe received inside the seal.

Figure 1:
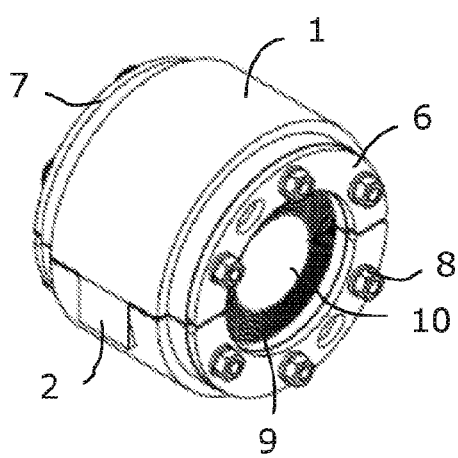
FIG. 1 is a perspective view of a seal provided with an outer diameter extender according to the present invention.

An outer diameter expander 1, having a general semi-cylindrical form is to be placed at the outside of a cylindrical seal 4, forming a lead-through. In the embodiment shown in FIG. 1, the outer diameter expander 1 is formed of two parts that are placed around the seal 4, to form the outer diameter extender 1. Each of the two parts forming the outer diameter expander 1 has a protruding part, in the form of a tongue 2, at one edge and a recess 3 at an opposite edge. Both the tongue 2 and the recess 3 extend in a circumferential direction. When forming the outer diameter extender 1 of the two parts, the tongue 2 of one of the parts is to be received inside the recess 3 of the other part, and vice versa. The formed outer diameter extender 1 will have a cylindrical form with a central through opening. In other embodiments of the outer diameter expander, each part of the outer diameter expander has more than one tongue and a corresponding number of recesses.

Figure 2:
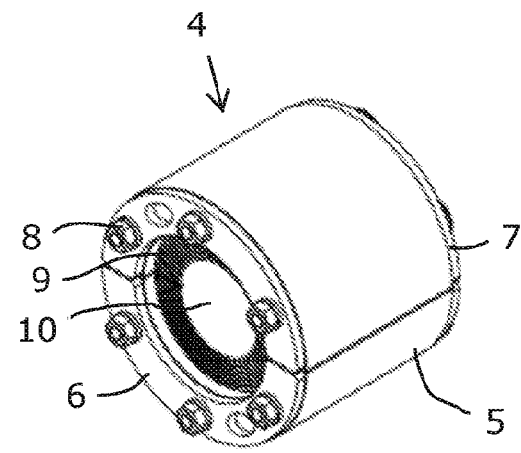
FIG. 2 is a perspective view of the seal of FIG. 1.
Figure 3:
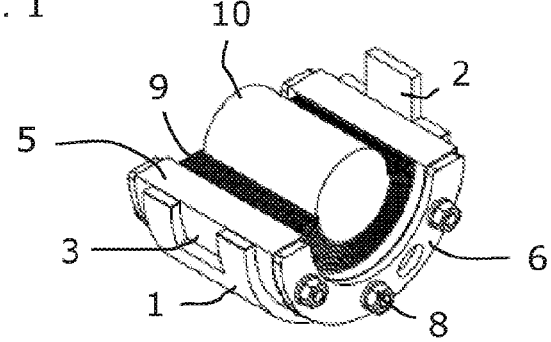
FIG. 3 is a perspective view of one half of the seal and the outer diameter expander of FIG. 1.

The outer diameter extender 1 can be used with different types of cylindrical seals. In FIG. 2 one embodiment of a cylindrical seal 4 is indicated. The seal 4 comprises a compressible body 5, front fittings 6, rear fittings 7, screws 11, nuts 8, peelable sheets 9 and a blind 10. The peelable sheets 9 are used to adapt the inner diameter of the seal 4 to a cable 23 or the like to be received inside the seal 4. By peeling off one or more sheets 9 the inner diameter of the seal 4 is increased.

The outer diameter extender 1 is attached to the outside of the seal 4 by means of an adhesive. The outer diameter extender 1 is normally made of the same material as the compressible body 5 of the seal 4.

Figure 6:
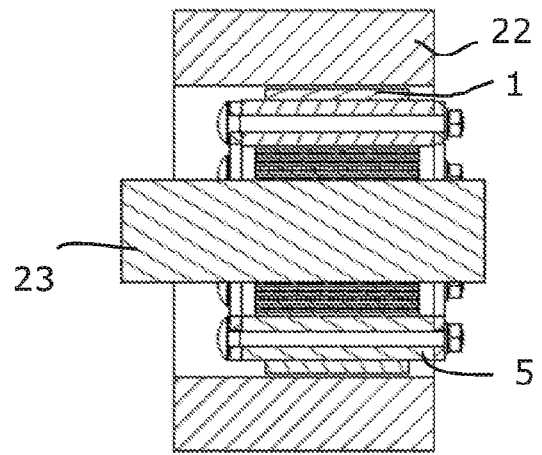
FIG. 6 is a sectional view of the seal and outer diameter extender of FIG. 1 mounted in a wall.

The lead-through comprising the seal 4 and the outer diameter extender 1 is to be received in an opening in a wall 22 or other partition or in a sleeve. One example of placement of a lead-through in a wall 22 is shown in FIG. 6. The front fittings 6 and the rear fittings 7 are placed on opposite ends of the compressible body 5 and are connected to each other by means of the screws 11 and nuts 8. The screws 11 are received in through openings of the rear fittings 7, through openings 20 of the seal 4 and through openings of the front fittings 6. The nuts 8 are placed on a part of the screws 11 extending out from the front fitting 6. By means of the screws 11 and nuts 8 the front fittings 6 and the rear fittings 7 may be moved towards and away from each other. In the shown embodiment the seal 4 is formed of two identical halves, and each half comprises half of the compressible body 5, the fittings 6, 7, the screws 11, nuts 8 and the sheets 9. Further, in one of the halves a blind 10 is received, which blind 10 is to be removed when to receive a cable 23 or the like inside the seal 4. When the two halves of the seal 4 are put together, the compressible body 5 will have a cylindrical form with a central through opening. The peelable sheets 9 are placed on the inside of said central through opening. By reducing the distance between the fittings 6, 7 on opposite sides of the compressible body 5, the compressible body 5 will be compressed in axial direction and thereby expand in radial direction both inwards and outwards. The radial expansion of the seal 4 is taken up by the outer extender 1 in that the tongues 2 of respective part of the outer diameter extender 1 will move in circumferential direction in relation to the recesses 3 of respective part of the outer diameter extender 1. By said expansion in radial direction the seal 4, with the outer diameter extender 1 is held in place inside an opening or a sleeve at the same time as it will seal against a cable 23, wire or pipe received inside the seal 4.

In another embodiment, the compressible body of the seal is made in one piece and is either openable or completely closed. In further embodiments, there are no peelable sheets inside the seal.

In use the outer diameter extender 1 is fastened on the outside of the seal 4, surrounding the seal 4. The outer diameter extender 1 is normally attached to the seal 4 by means of an adhesive forming a lead-through. Before placing the lead-through on a cable 23 or the like, a number of the peelable sheets 9 may be peeled off from the inside of the seal 4, in order to adapt an inner diameter of the seal 4 to the outer diameter of cable, wire or pipe to be received inside the seal 4. The lead-through is then brought into an opening of a wall 22 or a sleeve. Thereafter the compressible body 5 of the seal 4 is compressed in axial direction by tightening of the nuts 8 on the screws 11. By the compression in axial direction, there will be an expansion in radial direction of the compressible body 5, which radial expansion will be taken up by movement of the tongue 2 of each part of the outer diameter expander 1 in the recess 3 in the other part of the outer diameter expander 1.

Figure 7:
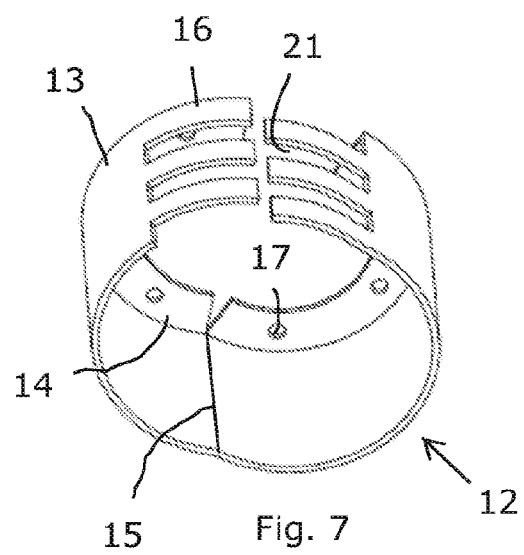
FIG. 7 is a perspective view of a second embodiment of the outer diameter extender according to the present invention.
Figure 8:
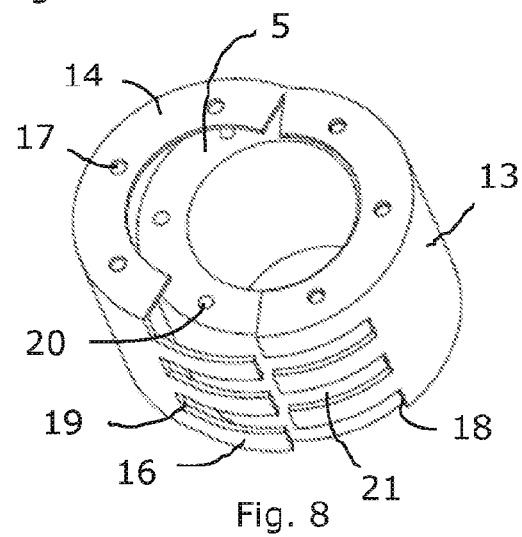
FIG. 8 is a perspective view illustrating a stage in fastening of the outer diameter extender of FIG. 7 to the seal of FIG. 2.

In FIGS. 7 and 8 an outer diameter extender 12 according to an alternative embodiment is shown. Said outer diameter extender 12 has a cylindrical part 13, in the form of a shell. At one end of the cylindrical part 13 there is a circumferential flange 14. The flange 14 is arranged perpendicular to the cylindrical part 13 and the flange 14 is directed inwards towards the centre of the outer diameter extender 12. The flange 14 has a number of through openings 17. The outer diameter extender 12 is formed of two parts held together by means of an axially extended hinge part 15. Due to the hinge part 15, the outer diameter extender 12 may be opened. The hinge part 15 is formed by an axial recess along the entire axial length of the outer diameter extender 12. At the side of the cylindrical part 13 opposite the hinge part 15, the cylindrical part 13 can be opened, whereby a through gap is formed between a first axial edge 18 and an opposite second axial edge 19 of the cylindrical part 13. On respective axial edge 18, 19 a number of protruding parts in the form of fingers 16 are arranged projecting in circumferential direction from the cylindrical part 13. The fingers 16 are arranged at respective first and second axial edge 18, 19 with a distance to adjacent fingers 16. The distance between the fingers 16 forms recesses 21 corresponding with the width of the fingers 16 of the opposite axial edge of the cylindrical part 13 of the outer diameter extender 12. The fingers 16 at respective axial edge 18, 19 of the cylindrical part 13 are placed on alternating positions in such a way that one finger 16 at one axial edge 18, 19 can be received in the recess 21 between two fingers 16 at the other axial edge 18, 19. In the shown embodiment, there are three fingers 16 projecting from the first axial edge 18 and the second axial edge 19, respectively. A person skilled in the art realizes that the outer diameter extender 12 can have other numbers of fingers 16 at respective axial edge 18, 19.

At the first axial edge 18, the flange 14 extends in circumferential direction in such a way that an outer free edge of the flange 14 is in line with the outer free ends of the fingers 16 at the first axial edge 18. One finger 16 at the first axial edge 18 is in one piece with the flange 14. At the second axial edge 19 of the cylindrical part 13, the flange 14 ends at the second axial edge 19. Thus, there is no flange placed above the fingers 16 at the second axial edge 19 of the cylindrical part 13. The dimensions and placements of the flange 14 and the fingers 16 are such that in the closed position of the outer diameter extender 12, the outer ends of the fingers 16 will abut respective opposite axial edges 18, 19 and the edges of the flange 14 will also abut each other. Thus, in said closed position for the outer diameter expander 12 the cylindrical part 13 forms a complete cylinder together with the fingers 16 and the flange 14 forms a complete ring.

The length of the fingers 16 of the cylindrical part 13 in the circumferential direction should be at least so long that the fingers 16 will not leave the recess 21 between the opposite fingers 16 when the seal 4 has expanded maximally in the radial direction.

In use the outer diameter extender 12 is placed around the seal 4. The outer diameter extender 12 is fastened to the seal 4 in that the flange 14 of the outer diameter extender 12 is placed between the front fittings 6 or the rear fittings 7 and the compressible body 5 of the seal 4. To mount the outer diameter extender 12 at the seal 4, the nuts 8 of the seal 4 are loosened and the front fitting 6 and/or rear fitting 7 is removed. Thereafter, the outer diameter expander 12 is placed on the seal 4, whereby the through openings 17 of the flange 14 is to be received on the screws 11 of the seal 4 and the cylindrical part 13 of the outer diameter extender 12 is placed on the outside of the compressible body 5 of the seal 4. Then the front fitting 6 and/or rear fitting 7 is placed on the screws 11 of the seal 4 and the nuts 8 are then placed and tightened on the screws 11. By means of the hinge part 15 of the outer diameter extender 12 the seal 4 with fastened outer diameter extender 12 is then opened to place it on a cable, wire or pipe, whereby the fingers 16 at respective axial edge 18, 19 of the outer diameter extender 12 will be placed in interleaved positions. Before final placement of the seal 4 with attached outer diameter extender 12 on the cable, wire or pipe, a number of the peelable sheets 9 may be peeled off from the inside of the seal 4, in order to adapt an inner diameter of the seal 4 to the outer diameter of a cable or the like to be received inside the seal 4. The seal 4 with the outer diameter extender 12 is then brought into an opening of a wall or a sleeve, where after the compressible body 5 is compressed in axial direction by tightening of the nuts 8 on the screws 11. The radial expansion of the compressible body 5 is taken up by the outer diameter extender 12, whereby there will be a mutual movement in circumferential direction between the fingers 16 of respective axial edge 18, 19. The distance between the first and second axial edges 18, 19 will thereby increase.

In the totally closed condition, the inner diameter of the cylindrical part 13 of the outer diameter extender 12 shall correspond with the outer diameter of the compressible body 5 of the seal 4, with the seal 4 in a non-compressed state. In the totally closed position of the outer diameter extender 12 the first axial edge 18 and the second axial edge 19 of the cylindrical part 13 of the outer diameter extender 12 abut each other.

The outer diameter extender is adapted to the seal with which it is to co-operate. Normally only the hole pattern of the flange 14 needs to be amended depending on the type of seal used.

The outer diameter extender 1, 12 of the present invention expands the outer diameter range of the seal 4. If for instance the seal without the outer diameter expander is adapted to be received in openings having an inner diameter in the range of 70-75 mm and the outer diameter extender 1, 12 has a wall thickness of 2.5 mm, the seal 4 with outer diameter extender 1, 12 will be adapted to be received in openings having an inner diameter in the range of 75-80 mm. Thus, the seal 4 is adapted to be received in openings having a diameter in the range of 70-80 mm, whereby the outer diameter extender 1, 12 is fastened to the seal 4 for the upper part of said range and the seal 4 is used without the outer diameter extender 1, 12 in the lower part of said range.

Figure 9:
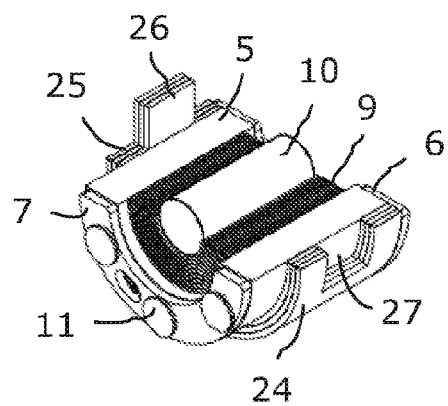
FIG. 9 is a perspective view of one half of the seal according to FIG. 2 with one half of a further embodiment of an outer diameter extender according to the present invention.

In FIG. 9 one half of a lead-through is shown, having an outer diameter extender 24 placed on the outside of one half of a seal. In the same way as described above the outer diameter extender 24 is formed of two parts, of which one is shown in FIG. 9. The outer diameter extender 24 comprises a number of peelable sheets 25 placed on top of each other. Each of the two parts of the outer diameter extender 24 has a tongue 26 and a recess 27. The tongue 26 of one part of the outer diameter extender 24 is to be received in the recess 27 of the other part of the outer diameter extender 24. The outer diameter extender 24 is fasten to the seal 4 by means of an adhesive.

Figure 4:
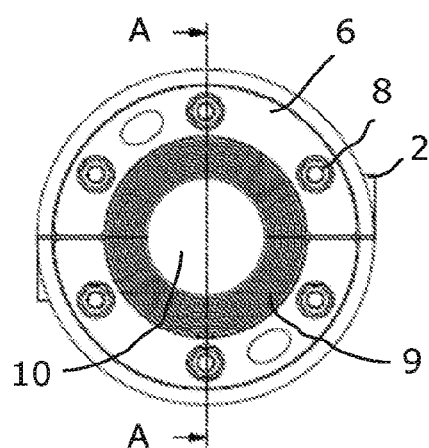
FIG. 4 is an end view of the seal and the outer diameter expander of FIG. 1.
Figure 5:
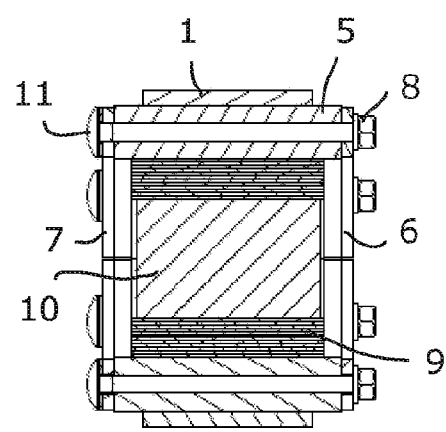
FIG. 5 is a sectional view taken along the line A-A in FIG. 4.
Figure 10:
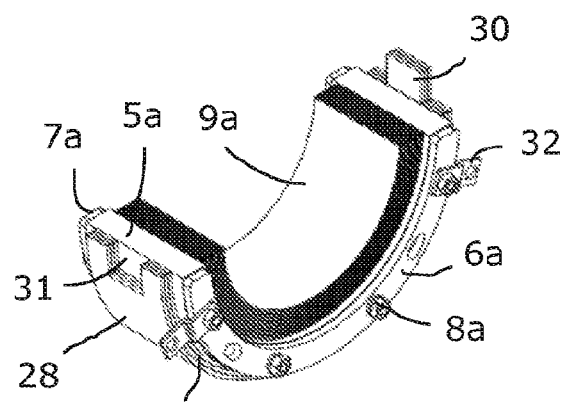
FIG. 10 is a perspective view of one half of a seal with one half of an outer diameter extender corresponding to the outer diameter extender of FIG. 9, but of a different size.

In FIG. 10 one half of a lead-trough is shown, having an outer diameter extender 28. The outer diameter extender 28 is made of two parts, of which one is shown in FIG. 10. The outer diameter extender 28 is shown placed on a seal corresponding to the seal of FIG. 4, but of a different size. Thus, the seal of FIG. 10 has a compressible body 5a, a front fitting 6a, a rear fitting 7a, nuts 8a, screws and inner peelable sheets 9a. The seal has plates 32 on some screws, which plates 32 are to be fastened to a wall or other partition. The outer diameter extender 28 comprises a number of peelable sheets 29 placed on top of each other. Each of the two parts of the outer diameter extender 28 has a tongue 30 and a recess 31. The tongue 28 of one of the parts of the outer diameter extender 28 is received in the recess 31 of the other part of the outer diameter extender 28. The outer diameter extender is fastened to the seal by means of an adhesive.

By forming the outer diameter extender 24, 28 of a number of peelable sheets 25, 29 the diameter range for an opening suitable for receiving the seal 4 with an outer diameter extender 24, 28 will increase further. In order to adapt a lead-through with an outer diameter extender 24, 28 having outer peelable sheets 25, 29 to the inner diameter of an opening of a wall, one or more of the peelable sheets 25, 29 are peeled off.

The thickness of the walls of the outer diameter extender 1, 12 may have different values, depending on the dimensions and types of seals to be used.

The invention claimed is:

1. A lead-through for cables, wire or pipes comprising a cylindrical seal and an outer diameter extender wherein the outer diameter extender is adapted to be mounted on an outer surface of the cylindrical seal, that the outer diameter extender comprises two parts, wherein each of the two parts has at least one protruding part and at least one recess, whereby the at least one protruding part of one of the parts of the outer diameter extender is to be received in the at least one recess of the other part of the outer diameter extender,
    wherein the cylindrical seal comprises a cylindrical compressible body, a front fitting, a rear fitting, screws and nuts, wherein the front fitting and the rear fitting are placed on opposite ends of the cylindrical compressible body, wherein the screws goes through openings of the cylindrical compressible body, the front fitting and the rear fitting and wherein the cylindrical compressible body has a central through opening adapted for receiving a cable, wire or pipe.

2. The lead-through of claim 1, wherein a number of peelable sheets are placed on the inside of the central through opening of the compressible body of the cylindrical seal.

3. The lead-through of claim 1, wherein the at least one protruding part and the at least one recess of the outer diameter extender are extended in circumferential direction.

4. The lead-through of claim 1, wherein the outer diameter extender is formed of a number of peelable sheets placed on top of each other.

5. The lead-through of claim 1, wherein the one or more protruding parts of each part of the outer diameter extender is a tongue.

6. The lead-through of claim 1, wherein the outer diameter extender is fastened to the seal by means of an adhesive.

7. The lead-through of claim 1, wherein the outer diameter extender comprises a cylindrical part and a flange at one end of the cylindrical part and that the flange is perpendicular to the cylindrical part and is directed inwards towards a center of the outer diameter extender, wherein the flange has a number of through openings and wherein the flange extends along the circumference of the cylindrical part.

8. The lead-through of claim 7, wherein a hinge part is arranged on the cylindrical part between the two parts of the outer diameter extender.

9. The lead-through of claim 8, wherein the hinge part has the form of a weakening extending in axial direction along the entire cylindrical part.

10. The lead-through of claim 8, wherein the cylindrical part has a through gap opposite the hinge part, by which gap a first axial edge and a second axial edge is formed in the cylindrical part and wherein the at least one protruding part of each part of the outer diameter extender part is a number of fingers extending circumferentially from respective first axial edge and second axial edge of the cylindrical part.

11. The lead-through of claim 10, wherein the at least one recess of each part of the outer diameter extender is formed by a distance between adjacent fingers, whereby the fingers of one of the parts of the outer diameter extender are received between the fingers of the other part of the outer diameter extender.

12. The lead-through of claim 10, wherein each part of the outer diameter extender has three fingers extending from the first axial edge and the second axial edge, respectively.

13. The lead-through of claim 10, wherein the flange ends in level with the second axial edge of the cylindrical part of the outer diameter extender and wherein the flange ends in level with the free outer ends of the fingers of the first axial edge of the outer diameter extender.

14. The lead-through of claim 7, wherein the flange of the outer diameter extender is adapted to be placed between the front fitting or the rear fitting and the compressible body of the seal at one end of the seal and, wherein at least one screw of the seal is to be received in the openings of the flange.

* * * * *